United States Patent
Jahn (10) Patent No.: US 11,265,320 B2
(45) Date of Patent: Mar. 1, 2022

(54) EXTENDED REDIRECT MIRROR

(71) Applicant: HEWLETT PACKARD ENTERPRISE DEVELOPMENT LP, Houston, TX (US)

(72) Inventor: Percy Jahn, Kaiserslautern (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 215 days.

(21) Appl. No.: 16/526,789

(22) Filed: Jul. 30, 2019

(65) Prior Publication Data

US 2021/0037016 A1 Feb. 4, 2021

(51) Int. Cl.
*H04L 29/06* (2006.01)
*H04L 69/22* (2022.01)
*H04L 12/46* (2006.01)
*H04L 69/164* (2022.01)

(52) U.S. Cl.
CPC ........ *H04L 63/101* (2013.01); *H04L 12/4633* (2013.01); *H04L 12/4641* (2013.01); *H04L 69/164* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 2009/0125470 | A1* | 5/2009 | Shah | H04L 63/0263 706/47 |
| 2017/0118041 | A1* | 4/2017 | Bhattacharya | H04L 41/5054 |
| 2019/0104090 | A1* | 4/2019 | Labonte | H04L 49/3018 |
| 2020/0296007 | A1* | 9/2020 | Finn, II | H04L 41/145 |

* cited by examiner

*Primary Examiner* — Natisha D Cox
(74) *Attorney, Agent, or Firm* — Hewlett Packard Enterprise Patent Department (57) ABSTRACT

Examples disclosed herein relate to a method comprising determining, at a first gateway, that a packet originating from a first device has hit an access control list (ACL) rule, wherein the first gateway has an Application Specific Integrated Circuit (ASIC) that does not have the capability to log packets that hit ACL rules. The method may include creating, at the first gateway, a copy of the packet and including, at the first gateway, an identification of the ACL Rule and an identification of the first device into a header of the copy of the packet. The method may include transmitting, from the first gateway, the copy of the packet to a first network device via a network tunnel.

20 Claims, 5 Drawing Sheets

FIG. 5

EXTENDED REDIRECT MIRROR

BACKGROUND

An access-control list (ACL) is a set of rules that are applied to network identifiers (such as port numbers, IP addresses, etc.) that are available on a host or other network, each with a list of hosts and/or networks permitted to use the service.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

ACL rules may, for example, define which network addresses are able to access certain network features. An ACL rule may, for example, allow certain network addresses and disallow certain network addresses from accessing the network features. For example, an ACL rule may permit certain activity and drop certain activity. Packets "hit" these ACL rules may be tracked in a process called ACL logging. ACL logging copies the packets that hit the ACL to the CPU for further processing (e.g. show the packet to users). But ACL logging is not supported by a variety of network application specific integrated circuits (ASIC) and therefore be unavailable in certain networking environment. On the contrary sending a lot of packets to the CPU might create a processing bottleneck that might affect the whole network. In case the ASICs is not capable of executing this copy process ACL logging might be implemented as a workaround based on ACL counters and thus may need ACL counter resources. Normally ASICs offer less counters than ACL resources. So most of the time not all hits can be accounted for. In case ACL counters are used, only the amount of packets that hit a specific rule is visible, but not the packet itself. This limits capabilities of network operators to troubleshoot ACL problems. Therefore, it may be beneficial to add the functionality of ACL logging through a less resource intensive process but still delivering the same visibility to certain network environments.

Remote mirroring is a technique where data packets on a network are copied and transmitted to a location separate from their destination. Many ASICs are capable of redirecting or mirroring inbound packets. Embodiments of the present disclosure enable the ability to redirect (at least inbound) packets into a network tunnel, such as a VxLAN tunnel, at a network gateway device. The network gateway device can add a variety of information to the header of the data packet, such as the identity of the sender of the packet, the incoming port, the ACL number, the ACL rule that was hit, etc. The network gateway can also transmit the mirrored data packets to a receiver that can receive the packets, decapsulate the packets and forward them to an arbitrary port or make them visible to end-users (e.g. network management station). In this manner, packets that hit specific ACL rules can be identified, even in environments where the network ASIC does not support ACL logging. In addition, Mirroring/Redirecting is done in the ASIC and therefore does not require any additional CPU processing.

A method for redirect mirror may include determining, at a first gateway, that a packet originating from a first device has hit an access control list (ACL) rule, wherein the first gateway has an Application Specific Integrated Circuit (ASIC) that does not have the capability to log packets that hit ACL rules. The method may include creating, at the first gateway, a copy of the packet and including, at the first gateway, an identification of the ACL Rule and an identification of the first device into a header of the copy of the packet. The method may also include transmitting, from the first gateway, the copy of the packet to a first network device via a network tunnel.

Figure 1:
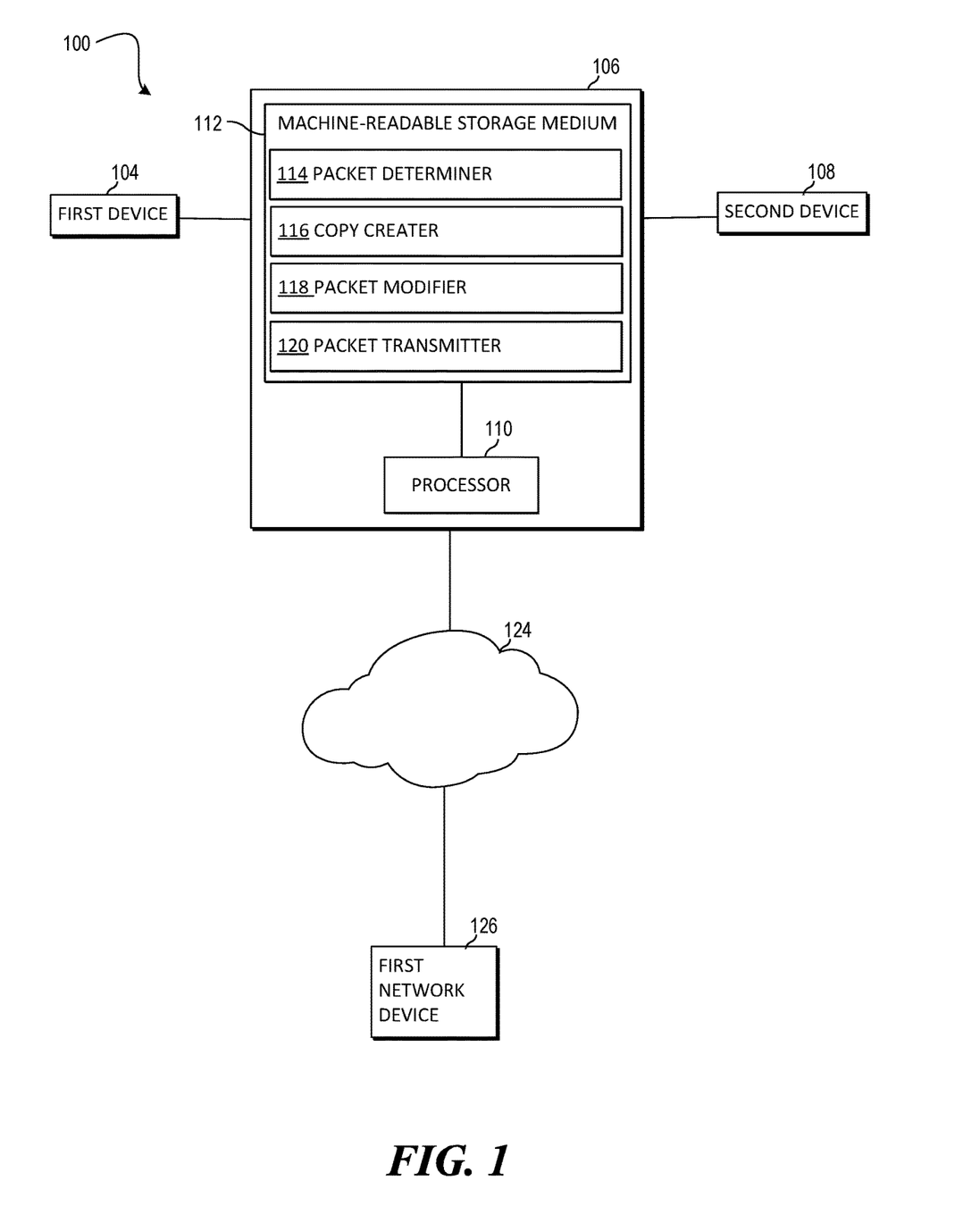
FIG. 1 is a block diagram of an example system for using a redirect mirror.

FIG. 1 is a block diagram of an example system 100 where using a redirect mirror may be useful. The system 100 may include a first device 104. The first device may be a client device, such as a laptop, mobile device, server, IoT device, etc. The first device 104 may be part of a network that may allow the first device 104 to communicate with a gateway device 106, a second device 108 as well as additional devices/services/networks/etc. Second network device 108 may be another client device, that may communicate with the devices on the network, such as device 108. It should be appreciated that the system 100 in FIG. 1 is a simplified system for exemplary purposes and that the systems and methods described herein may be used in systems with different numbers of devices, subnetworks, gateways devices, network devices, etc.

Gateway device 106 may be any number of network devices, as described above. For example, device 106 may be a network switch. A network device may be a device within a network that forwards data sent by a sender device toward a recipient device (or multiple recipient devices). In some examples, a network device includes a layer 2 switch that forwards data packets (also referred to as data frames or data units) based on layer 2 addresses in the data packets. Examples of layer 2 addresses include Medium Access Control (MAC) addresses. In alternative examples, a switch includes a layer 3 router that forwards data packets based on layer 3 addresses, such as Internet Protocol (IP) addresses in the data packets.

A "packet" or "data packet" can refer to any unit of data that can be conveyed over a network. A packet or data packet may also refer to a frame or data frame, a data unit, a protocol data unit, and so forth. A switch forwards data (in data packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

Gateway device 106 may be used to monitor traffic that belongs to a network. For example, gateway device 106 may be used in a local area network to ensure that certain rules are followed by the devices on the network, to ensure that only authorized devices gain access to certain network functions, etc. In this manner, gateway device 106 serves a gatekeeper role, where the device monitors network traffic and determines whether network traffic, devices, etc. hit certain ACL rules. Although only one gateway device 106 is depicted in system 100 of FIG. 1, in other aspects, multiple gateway devices 106 may be in use.

When a gateway device 106 receives a data packet, the gateway device 106 may determine whether the data packet hits an ACL rule. A network may have a number of ACLs, each ACL having a subset of rules that apply to the ACL. Depending on the functionality of a processor in the gateway device 106, such as an ASIC, packets that hit an ACL rule may be automatically dropped. A dropped packet is not transmitted to any further destinations and may be considered as part of a failed transmission.

For example, in the system 100 of FIG. 1, the gateway device 106 may receive a data packet from the first device 104 which is to be transmitted to the second device. However, the network may have an ACL listing certain devices that have permissions to transmit data over the network. If the first device is not on that ACL, than the packet transmitted from the first device may hit the ACL listing and be dropped.

However, in system 100, each packet that is dropped or forwarded for hitting an ACL rule may additionally be mirrored and transmitted into a network tunnel 124. The system 100 may have one network tunnel 124 per ACL. In this manner, the original packet is dropped or forwarded and the mirrored packet may be used for troubleshooting. Specifically, each inbound packet coming to the gateway device 106 may encapsulated into a UDP packet and that packet may be mirrored into a network tunnel, such as a VxLan tunnel.

Tunneling is a process by which network communications are channeled between two devices. A link may be created between the two devices and data may be encapsulated at one device before sending to the other.

In some aspects, the gateway device may include a variety of additional information in a VxLAN header of the mirrored packet. This information may include, for example, the source system, the location where the ACL is applied (e.g. interface name, . . . ) and the rule number that was hit. In the example illustrated in system 100 of FIG. 1, the source system may be network device 104 and the location where the ACL is applied may be network gateway 106.

Figure 2:
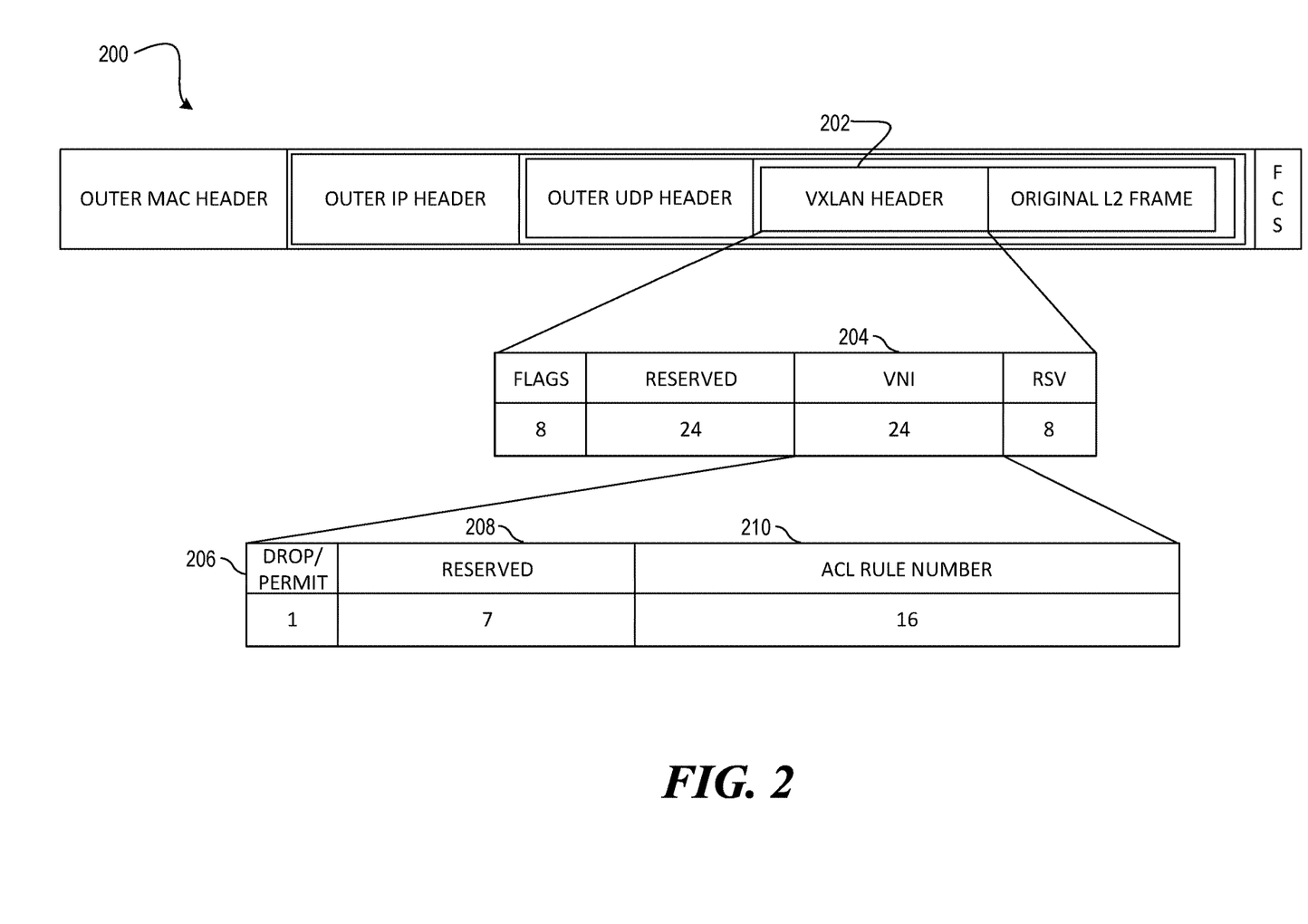
FIG. 2 is a block diagram of an example data packet header.

Turning briefly to FIG. 2, a block diagram of an example data packet header 200 is presented. The data packet header 200 may be an example header after the gateway device 106 has mirrored the original data packet and encapsulated additional information into the header. The data packet header 200 may have a variety of portions, including a VxLAN Header portion 202. The VxLAN header portion 202 may in turn have numerous portions including a VxLAN ID portion 204. In some aspects, the VxLAN ID portion 204 may be a 24 bit field.

The example VxLAN ID portion 204 of data packet header 200 may include a drop/permit field 206, a reserved field 208 and an ACL rule number field 210. The drop/permit field 206 may be used to indicate whether the packet was dropped and thus not transmitted to its destination or whether the packet was permitted to be transmitted. The ACL rule number field 210 may be used to identify which ACL rule the data packet hit. For example, each ACL rule may be associated with a rule number. After determining which ACL rule that the packet hit, the gateway device 106 may insert the rule number into the ACL rule number field 210.

The reserved field 208 may be used to identify the network tunnel, such as the network tunnel 124 depicted in system 100 of FIG. 1, that the packet was mirrored into to. As described above, a network may have a number of ACLs, each ACL having a subset of rules, and an equal number of tunnels, each tunnel corresponding to one of the ACLs. Accordingly, the reserved field 208 may be used to identify the tunnel and thus the ACL that was hit. In case the ASIC is capable of assigning different UDP destination port numbers in the outer UDP Header, this UDP port may be used to identify the tunnel and the reserved bits can be used for other data (e.g. interface number, client id, etc.). If not then the tunnel information might be part of the reserved bits 208.

Turning again to FIG. 1, after the gateway device 106 has mirrored the packet, added additional information to the header, the gateway device 106 may transmit the packet to a first network device 126 via the network tunnel 124. The first network device 126 may have a VxLAN receiver to decapsulate the packet and forward it to an arbitrary port. A device at the arbitrary port may be used for troubleshooting. For example, a network administrator or other worked may be able to access the information in the packet to determine why the packet was dropped. In some aspects, the packet may be transmitted to an automated or semiautomated system to troubleshoot the packet.

Gateway device 106 may include a processor 110 and a machine-readable storage medium 112 that may be coupled to each other through a communication link (e.g., a bus). Processor 110 may include a single or multiple Central Processing Units (CPU) or another suitable hardware processor(s), such as a network ASIC. Machine-readable storage medium 112 may store machine readable instructions may executed by processor 110. Machine-readable storage medium 112 may include any suitable combination of volatile and/or non-volatile memory, such as combinations of Random Access Memory (RAM), Read-Only Memory (ROM), flash memory, and/or other suitable memory.

Machine-readable storage medium 112 stores instructions to be executed by processor 110 including instructions for packet determiner 114, copy creator 116, packet modifier 118 and packet transmitter 120.

Processor 110 may execute packet determiner 114 to determine, at a first gateway, that a packet originating from a first device has hit an access control list (ACL) rule. The first gateway may have an Application Specific Integrated Circuit (ASIC) that does not have the capability to log packets that hit ACL rules. In some aspects, the packet may be destined for a second device and the packet determiner 114 may determine, based on the ACL rule, whether to drop or forward the packet. If the network ACL rule indicates dropping the packet, packet determiner 114 may drop the packet such that it is not transmitted to the second device. If the network ACL rule indicates permitting the packet, packet determiner 114 may forward the packet to the second device.

Processor 110 may execute copy creator 116 to create, at the first gateway, a copy of the packet. Processor 110 may execute packet modifier 118 to include at the first gateway, an identification of the ACL Rule and an identification of the first device into a header of the copy of the packet. In some aspects, packet modifier 118 may also include including a location identifier in the header, the location identifier corresponding to a network location where the ACL is hit. In some aspects, a UDP destination port number of the header is used to differentiate between different networks tunnels, and the different network tunnels includes the first network tunnel.

Processor 110 may execute packet transmitter 120 to transmit, from the first gateway, the copy of the packet to a first network device via a network tunnel. The network tunnel may be a VxLAN tunnel and the header may be a VxLAN ID portion of a VxLan Header.

Figure 3A:
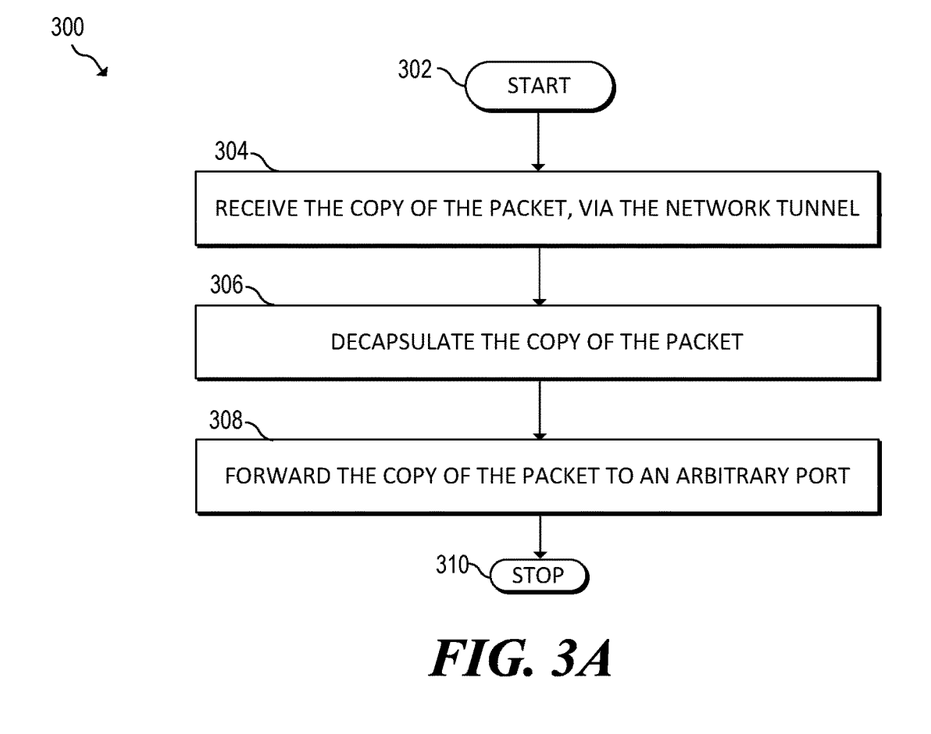
FIG. 3A is a flow diagram of an example method for using a redirect mirror.

FIG. 3A is a flow diagram of a method 300 for using a redirect mirror. The network where method 300 is performed may have a similar topology to system 100 described above. Accordingly, parts of and/or the entire method may be performed by, for example, the network device 126.

The method 300 may begin at block 302 and proceed to block 304 where the method may include receiving a copy of the packet via the network tunnel. The received copy may be similar or the same as the copy created by network gateway device 106 and described above in regards to FIG. 1. The method may proceed to block 306, where the method may include decapsulating or modifying the copy of the packet. Specifically, certain data in the header (such as some or all of the data discussed above) may be preserved. At block 306, the method may also include forwarding the copy of the packet to an arbitrary port, such as an ethernet port of a network device or a CPU. The method may proceed to block 308, where the method may end.

Figure 3B:
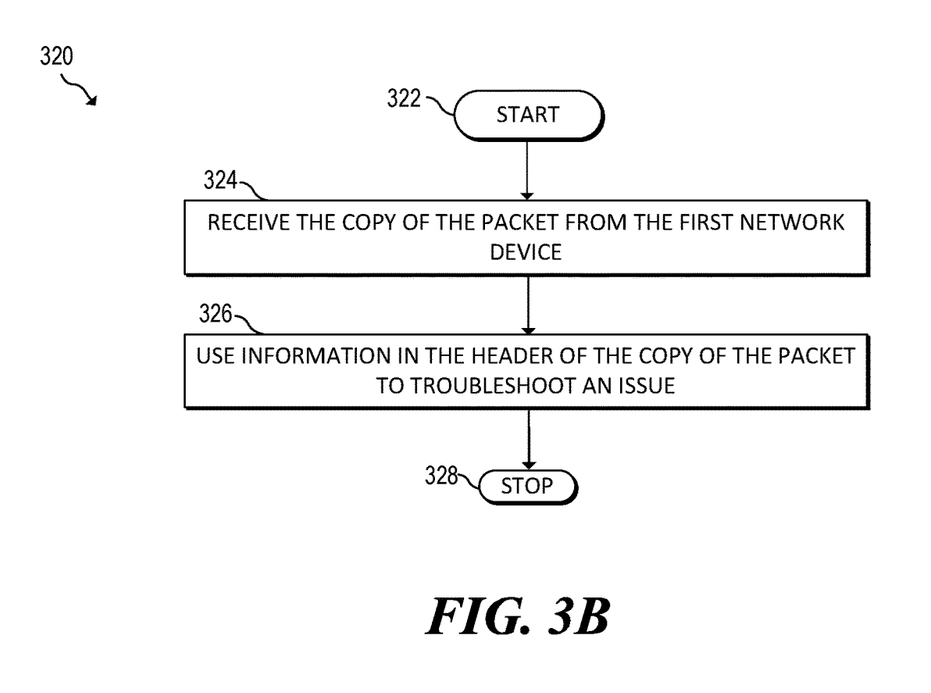
FIG. 3B is a flow diagram of another example method for using a redirect mirror.

FIG. 3B is a flow diagram for an example method 320 for using a redirect mirror. The network where method 320 is performed may have a similar topology to system 100 described above. Accordingly, parts of and/or the entire method may be performed by, for example, the devices 104, 106, 108 and/or 126 and/or other devices not illustrated. Specifically, the method 320 may be used for using the identification information in the data packet to trouble shoot an issue on the network of system 100.

The method may begin at block 322 and may proceed to block 324 where the method may include receiving a copy of the packet from the first network device. This may be the same or similar as the copy of the packet received at the first network device 126, described above in regards to FIGS. 1-3A. At block 326, the method may include using information in the header of the copy of the packet to troubleshoot an issue. For example, the information may indicate a certain ACL rule that was hit, a certain originating device identification of the data packet and that as a result of hitting the ACL rule the data packet was dropped. As one example, this data may be used to determine that the originating device does not have proper access privileges. The method may proceed to block 328, where the method may end.

Figure 4:
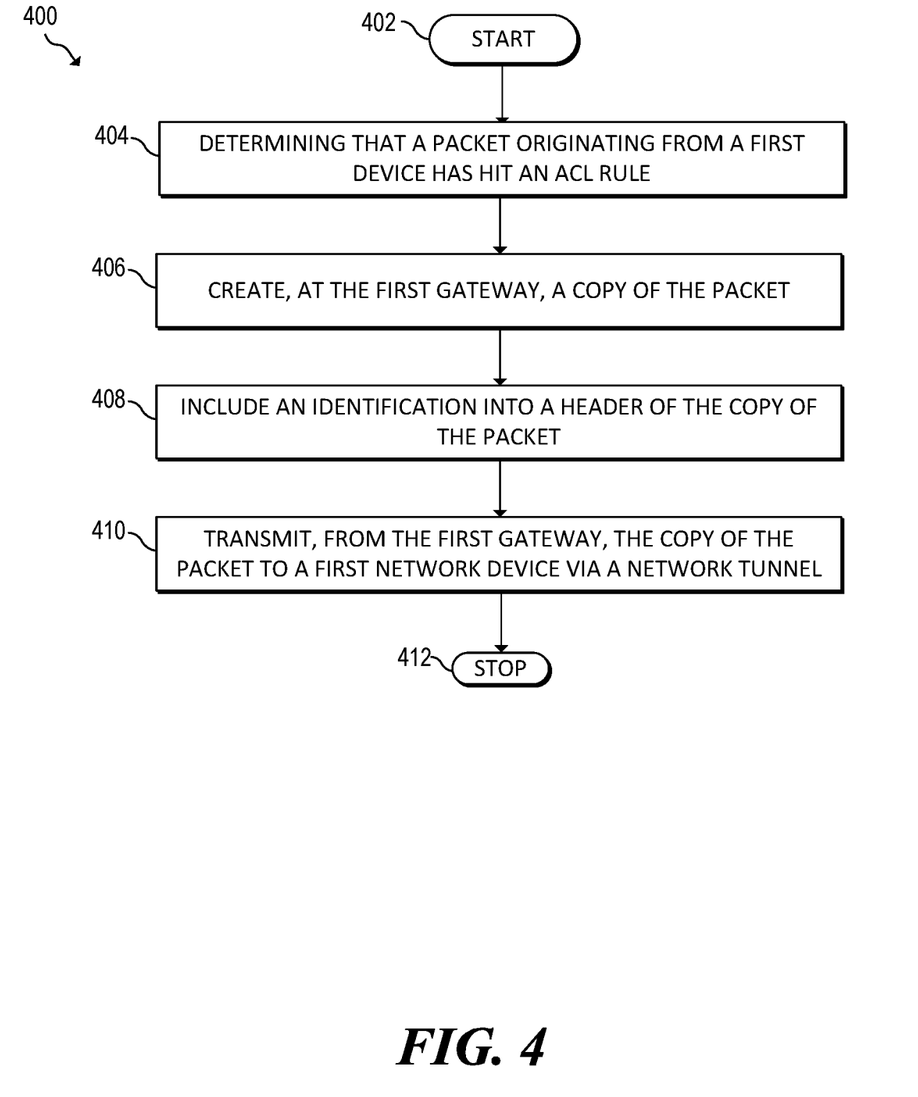
FIG. 4 is a flow diagram of another example method for using a redirect mirror.

FIG. 4 is a flow diagram for an example method 400 for using a redirect mirror. The network where method 400 is performed may have a similar topology to system 100 described above. Accordingly, parts of and/or the entire method may be performed by, for example, the devices 104, 106, 108 and/or 126 and/or other devices not illustrated.

The method may begin at block 402 and may proceed to block 404 where the method may include determining, at a first gateway, that a packet originating from a first device has hit an access control list (ACL) rule. The first gateway may have an Application Specific Integrated Circuit (ASIC) that does not have the capability to log packets that hit ACL rules. In some aspects, the packet may be destined for a second device and the method may include determining, based on the ACL rule, whether to drop or forward the packet. If network ACL rule indicates dropping the packet, the method may include dropping, by the first gateway, the packet such that it is not transmitted to the second device. If the network ACL rule indicates permitting the packet, the method may include forwarding, by the first gateway, the packet to the second device.

At block 406, the method may include creating, at the first gateway, a copy of the packet. At block 408, the method may include including, at the first gateway, an identification of the ACL Rule and an identification of the first device into a header of the copy of the packet. In some aspects, the method 400 may also include including a location identifier in the header, the location identifier corresponding to a network location where the ACL is hit. In some aspects, a UDP destination port number of the header is used to differentiate between different networks tunnels, and the different network tunnels includes the first network tunnel.

At block 410, the method may include transmitting, from the first gateway, the copy of the packet to a first network device via a network tunnel. The network tunnel may be a VxLAN tunnel and the header may be a VxLAN ID portion of a VxLan Header. The method may proceed to block 412, where the method may end.

Figure 5:
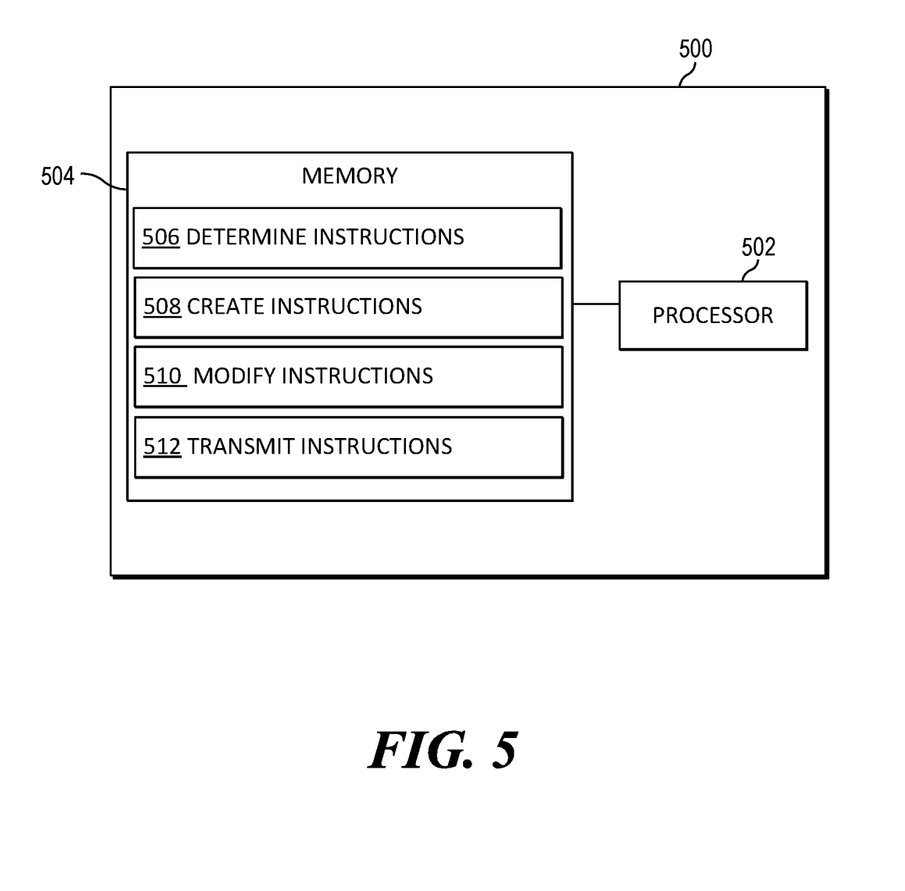
FIG. 5 is a block diagram of an example storage medium storing machine-readable instructions using a redirect mirror.

FIG. 5 is a block diagram of an example system 500 for using a redirect mirror. In the example illustrated in FIG. 5, system 500 includes a processor 502 and a machine-readable storage medium 504. In some aspects, processor 502 and machine-readable storage medium 504 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510 and 512. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, determine instructions 506, when executed by a processor (e.g., 502), may cause system 500 to determine, at a first gateway, that a packet originating from a first device has hit an access control list (ACL) rule. The first gateway may have an Application Specific Integrated Circuit (ASIC) that does not have the capability to log packets that hit ACL rules. In some aspects, the packet may be destined for a second device and determine instructions 506, when executed by a processor (e.g., 502), may cause system 500 to drop, by the first gateway, the packet such that it is not transmitted to a second device.

Create instructions 508, when executed by a processor (e.g., 502), may cause system 500 to create, at the first gateway, a copy of the packet.

Include instructions 510, when executed by a processor (e.g., 502), may cause system 500 to include, at the first gateway, an identification of the ACL Rule and an identification of the first device into a header of the copy of the packet. In some aspects, include instructions 510, when executed by a processor (e.g., 502), may cause system 500 to include a location identifier in the header, the location identifier corresponding to a network location where the ACL is hit. In some aspects, a UDP destination port number of the header is used to differentiate between different networks tunnels, and the different network tunnels includes the first network tunnel.

Transmit instructions 512, when executed by a processor (e.g., 502), may cause system 500 to transmit, from the first gateway, the copy of the packet to a first network device via a network tunnel. The network tunnel may be a VxLAN tunnel and the header may be a VxLAN ID portion of a VxLan Header.

The foregoing disclosure describes a number of examples for using a redirect mirror. The disclosed examples may include systems, devices, computer-readable storage media, and methods for using a redirect mirror. For purposes of explanation, certain examples are described with reference to the components illustrated in FIGS. 1-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
    determining, at a first gateway, that a packet originating from a first device has hit an access control list (ACL) rule, wherein the first gateway has an Application Specific Integrated Circuit (ASIC) that does not have the capability to log packets that hit ACL rules;
    creating, at the first gateway, a copy of the packet;
    including, at the first gateway, an identification of the ACL Rule and an identification of the first device into a header of the copy of the packet; and
    transmitting, from the first gateway, the copy of the packet to a first network device via a network tunnel.

2. The method of claim 1, wherein the packet is destined for a second device, the method comprising:
    determining, based on the ACL rule, whether to drop or forward the packet;
    wherein, when the network ACL rule indicates dropping the packet, dropping, by the first gateway, the packet such that it is not transmitted to the second device; and
    wherein, when the network ACL rule indicates permitting the packet, forwarding, by the first gateway, the packet to the second device.

3. The method of claim 1, wherein the network tunnel is a VxLAN tunnel and the header is a VxLAN ID portion of a VxLan Header.

4. The method of claim 1, wherein a UDP destination port number of the header is used to differentiate between different networks tunnels, and the different network tunnels includes the first network tunnel.

5. The method of claim 1, comprising:
    including a location identifier in the header, the location identifier corresponding to a network location where the ACL rule is hit.

6. The method of claim 1, comprising:
    receiving the copy of the packet, via the network tunnel, decapsulating the copy of the packet; and
    forwarding the copy of the packet to an arbitrary port.

7. The method of claim 6, comprising
    receiving, a second network device at the arbitrary port, the copy of the packet from the first network device; and
    using information in the header of the of the copy of the packet to troubleshoot an issue associated with the first device.

8. A non-transitory computer-readable storage medium encoded with instructions, the instructions executable by a processor of a system to cause the system to:
    determine, at a first gateway, that a packet originating from a first device has hit an access control list (ACL) rule, wherein the first gateway has an Application Specific Integrated Circuit (ASIC) that does not have the capability to log packets that hit ACL rules;
    create, at the first gateway, a copy of the packet;
    include, at the first gateway, an identification of the ACL Rule and an identification of the first device into a header of the copy of the packet; and
    transmit, from the first gateway, the copy of the packet to a first network device via a network tunnel.

9. The non-transitory computer-readable storage medium of claim 8, wherein the network tunnel is a VxLAN tunnel and the header is a VxLAN ID portion of a VxLan Header.

10. The non-transitory computer-readable storage medium of claim 8, wherein a UDP destination port number of the header is used to differentiate between different networks tunnels, and the different network tunnels includes the first network tunnel.

11. The non-transitory computer-readable storage medium of claim 8, wherein the instructions executable by the processor cause the system to:
    receive the copy of the packet, via the network tunnel, decapsulate and forward the copy of the packet to an arbitrary port.

12. The non-transitory computer-readable storage medium of claim 8, wherein the instructions executable by the processor cause the system to:
receive the copy of the packet from the first network device; and
use information in the header of the of the copy of the packet to troubleshoot an issue associated with the first device.

13. The non-transitory computer-readable storage medium of claim 8, wherein the instructions executable by the processor cause the system to:
include a location identifier in the header, the location identifier corresponding to a network location where the ACL is hit.

14. The non-transitory computer-readable storage medium of claim 8, wherein the instructions executable by the processor cause the system to:
determine, based on the ACL rule, whether to drop or forward the packet;
wherein, when the network ACL rule indicates dropping the packet, drop, by the first gateway, the packet such that it is not transmitted to the second device; and
wherein, when the network ACL rule indicates permitting the packet, forward, by the first gateway, the packet to the second device.

15. A system comprising:
a packet determiner to determine, at a first gateway, that a packet originating from a first device has hit an access control list (ACL) rule, wherein the first gateway has an Application Specific Integrated Circuit (ASIC) that does not have the capability to log packets that hit ACL rules;
a packet creater to create, at the first gateway, a copy of the packet;
a packet modifier to include, at the first gateway, an identification of the ACL Rule and an identification of the first device into a header of the copy of the packet; and
a packet transmitter to transmit, from the first gateway, the copy of the packet to a first network device via a network tunnel.

16. The system of claim 15, wherein the network tunnel is a VxLAN tunnel and the header is a VxLAN ID portion of a VxLan Header.

17. The system of claim 15, wherein a UDP destination port number of the header is used to differentiate between different networks tunnels, and the different network tunnels includes the first network tunnel.

18. The system of claim 15 comprising:
the packet modifier to include a location identifier in the header, the location identifier corresponding to a network location where the ACL is hit.

19. The system of claim 15 comprising:
a VxLAN receiver at the first network device to:
receive the copy of the packet, via the network tunnel, decapsulate and forward the copy of the packet to an arbitrary port.

20. The system of claim 19 comprising:
a second network device at the arbitrary port to:
receive the copy of the packet from the first network device; and
use information in the header of the of the copy of the packet to troubleshoot an issue associated with the first device.

* * * * *